United States Patent
Guillemette et al.

(10) Patent No.: US 10,232,541 B2
(45) Date of Patent: Mar. 19, 2019

(54) METHOD OF TUBULAR MICROLAYER AND MULTI-COMPONENT CO-EXTRUSION VIA DEFLECTOR PERTURBATION

(71) Applicant: Guill Tool & Engineering Co., Inc., West Warwick, RI (US)

(72) Inventors: Richard Guillemette, West Warwick, RI (US); Robert Peters, West Warwick, RI (US)

(73) Assignee: GUILL TOOL & ENGINEERING CO., INC., West Warwick, RI (US)

( * ) Notice: Subject to any disclaimer, the term of this patent is extended or adjusted under 35 U.S.C. 154(b) by 853 days.

(21) Appl. No.: 14/547,410

(22) Filed: Nov. 19, 2014

(65) Prior Publication Data
US 2015/0158233 A1    Jun. 11, 2015

Related U.S. Application Data

(60) Provisional application No. 61/905,999, filed on Nov. 19, 2013.

(51) Int. Cl.
| | | |
|---|---|---|
| B32B 1/08 | (2006.01) | |
| B29C 47/00 | (2006.01) | |
| B29C 47/06 | (2006.01) | |
| B29C 47/26 | (2006.01) | |
| B32B 27/08 | (2006.01) | |
| B32B 27/20 | (2006.01) | |
| B29K 101/12 | (2006.01) | |

(52) U.S. Cl.
CPC ............ *B29C 47/26* (2013.01); *B29C 47/265* (2013.01); *B29C 47/268* (2013.01); *B32B 1/08* (2013.01); *B32B 27/08* (2013.01); *B32B 27/20* (2013.01); *B29C 47/0023* (2013.01); *B29C 47/061* (2013.01); *B29C 47/065* (2013.01); *B29K 2101/12* (2013.01); *Y10T 428/1393* (2015.01)

(58) Field of Classification Search
CPC ..... B29C 47/0026; B29C 47/04; B29C 47/06; B29C 47/061; B29C 47/065; B29C 47/0811; B29C 47/0816; B29C 47/20; B29C 47/22; B29C 47/225; B29C 47/26; B29C 47/261; B29C 47/263; B29C 47/265; B29C 47/266; B29C 47/268; B29C 47/70; B29C 47/702; B29C 47/705; B29C 47/707
See application file for complete search history.

(56) References Cited

U.S. PATENT DOCUMENTS

| | | | | |
|---|---|---|---|---|
| 3,558,755 A | * | 1/1971 | Laben | B29C 47/0014 264/171.27 |
| 3,801,254 A | * | 4/1974 | Godtner | B29C 47/0023 264/515 |
| 4,721,637 A | * | 1/1988 | Suzuki | B29C 47/0004 138/172 |
| 4,731,216 A | * | 3/1988 | Topolski | B29C 47/24 264/171.26 |

(Continued)

*Primary Examiner* — Jeffrey M Wollschlager
(74) *Attorney, Agent, or Firm* — Ziegler IP Law Group, LLC

(57) ABSTRACT

The present invention relates to a method of transforming multilayered and/or multi-component streams into tubular shapes prior to or during extrusion by passing the streams over a deflector. The invention also relates to dies containing spiral, bowtie, circumferential and/or wrapping deflectors and products made by such methods.

13 Claims, 16 Drawing Sheets

A multilayered stream and a multi-component stream.

(56) References Cited

U.S. PATENT DOCUMENTS

| | | | | |
|---|---|---|---|---|
| 5,538,411 | A * | 7/1996 | Gates | B29C 47/0023 |
| | | | | 264/171.27 |
| 6,077,062 | A * | 6/2000 | Guillemette | B29C 47/0023 |
| | | | | 425/113 |
| 6,135,750 | A * | 10/2000 | Guillemette | B29C 47/0026 |
| | | | | 425/113 |
| 6,447,279 | B1 * | 9/2002 | Guillemette | B29C 47/0023 |
| | | | | 425/107 |
| 6,685,872 | B2 * | 2/2004 | Dooley | B29C 47/0023 |
| | | | | 264/171.26 |
| 2008/0315449 | A1 * | 12/2008 | Guillemette | B29C 47/061 |
| | | | | 264/108 |
| 2010/0215879 | A1 * | 8/2010 | Dooley | B29C 47/0023 |
| | | | | 428/35.7 |
| 2011/0241245 | A1 * | 10/2011 | Hiltner | B29C 47/0007 |
| | | | | 264/173.15 |

* cited by examiner

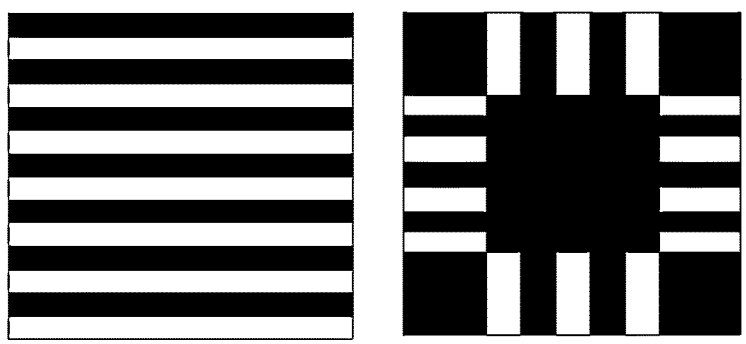
Figure 1. A multilayered stream and a multi-component stream.
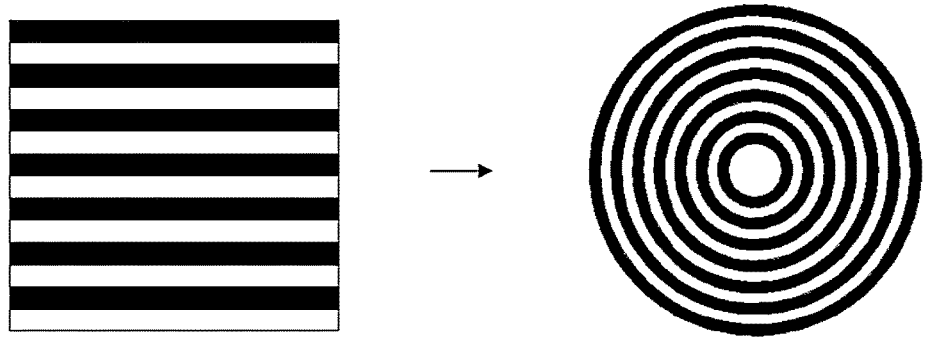
Figure 2. Cross Section of conversion of a multilayer stream into a multilayered tube.

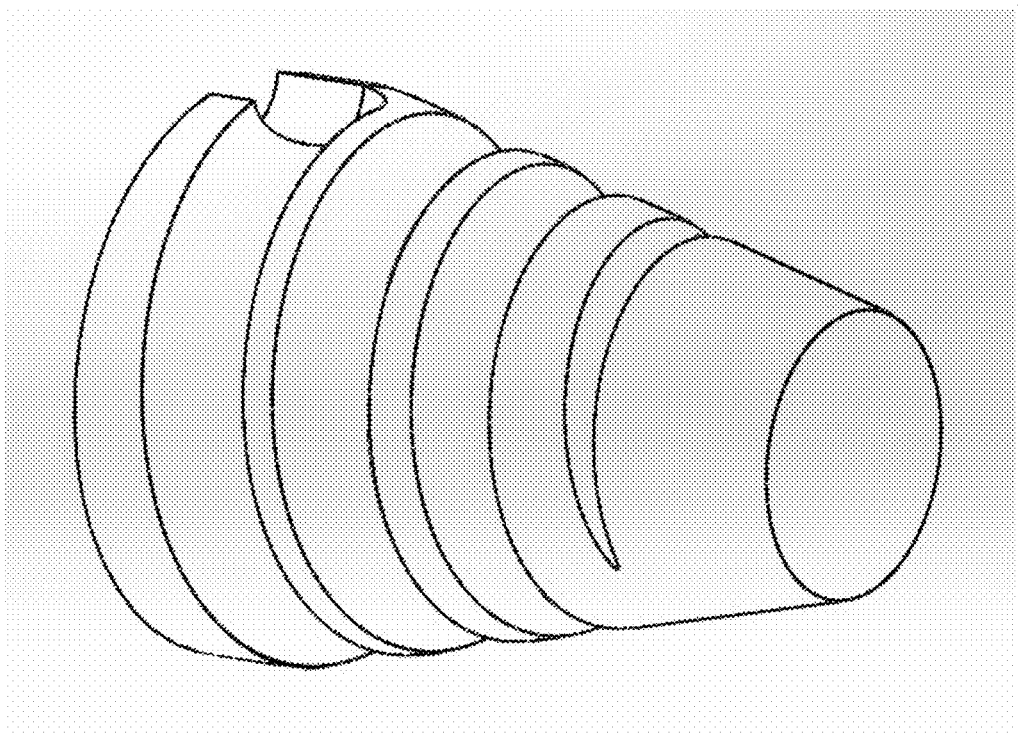
Figure 3. Single stream spiral delfector

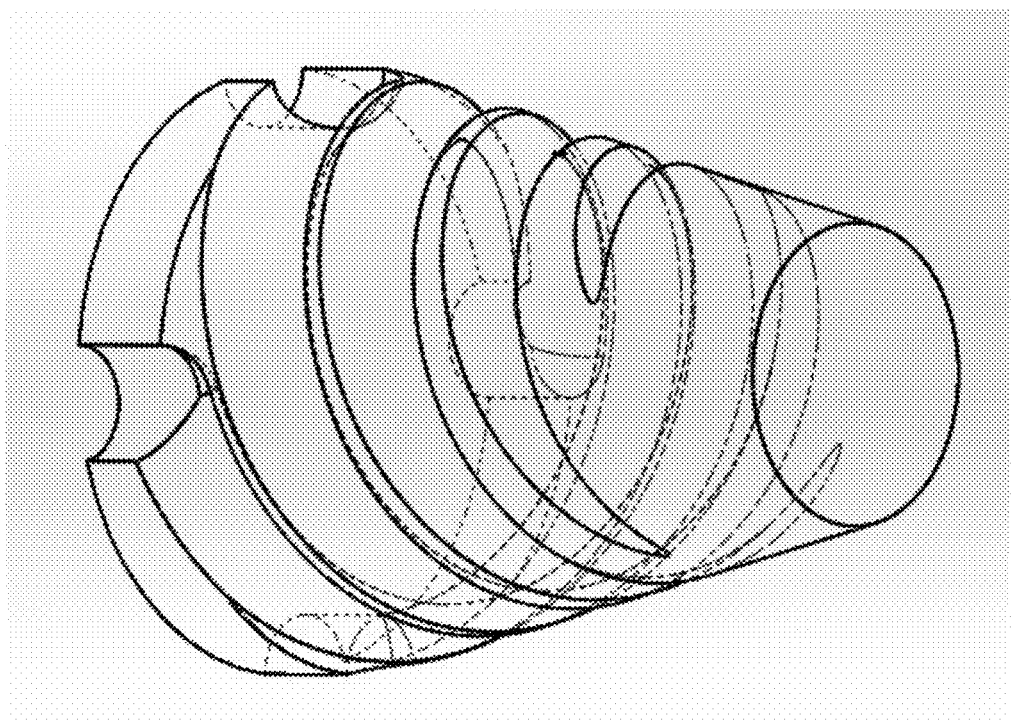
Figure 4. Four stream spiral deflector.

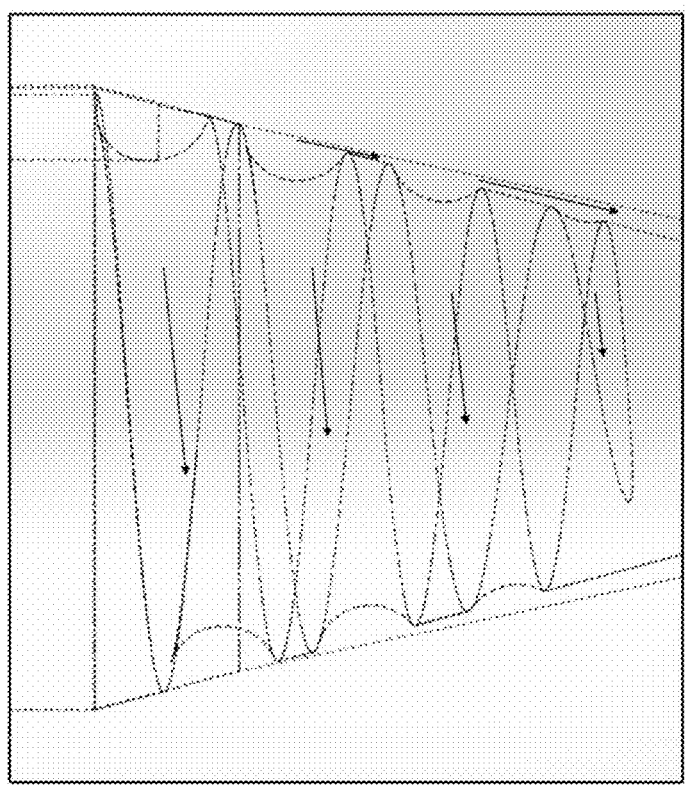
Figure 5. An example of a spiral deflector with arrows denoting the directions of the material flow.

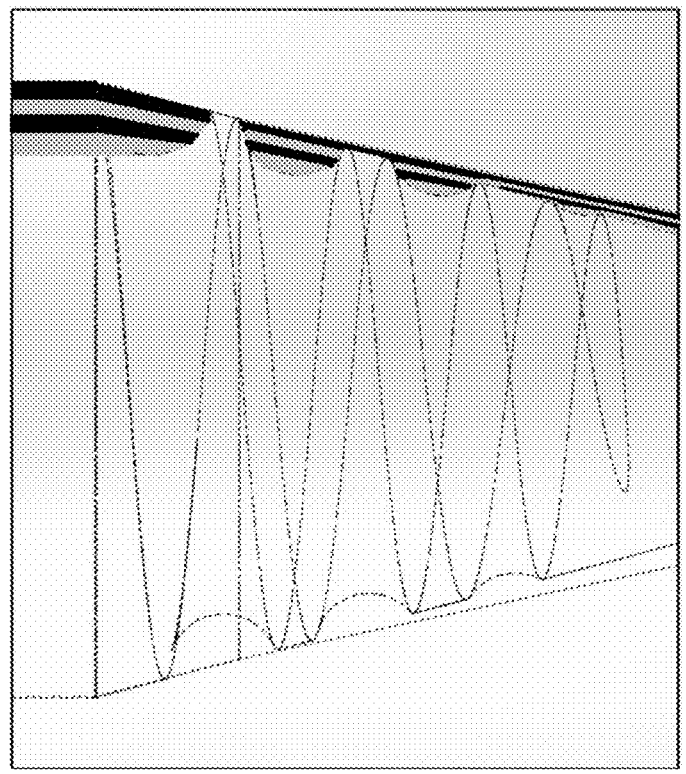
Figure 6. An example of a spiral deflector showing the distribution of four layers along the deflector.
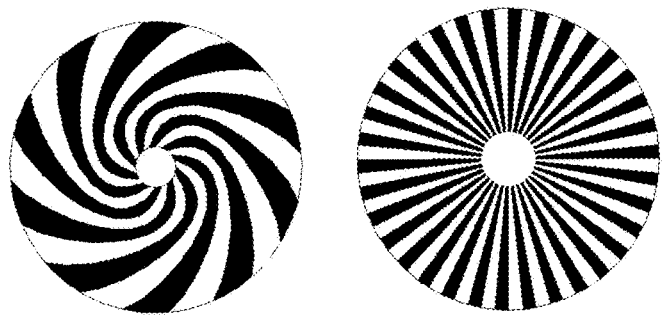

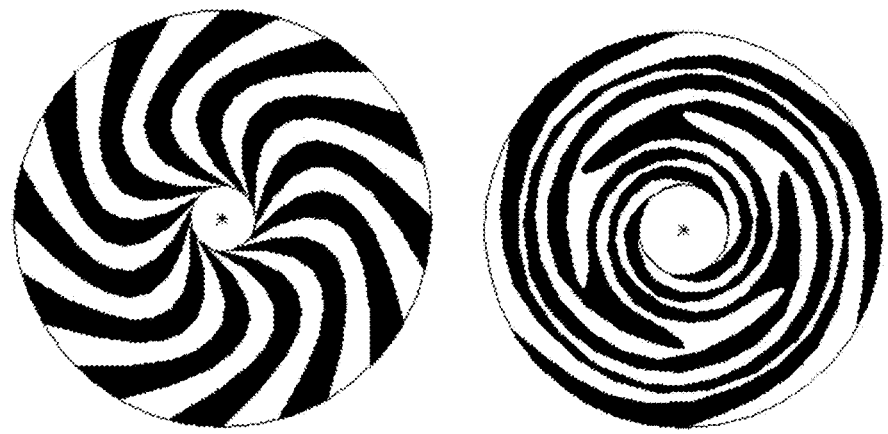
Figure 7. Example geometries involving vertical or off angle layers.
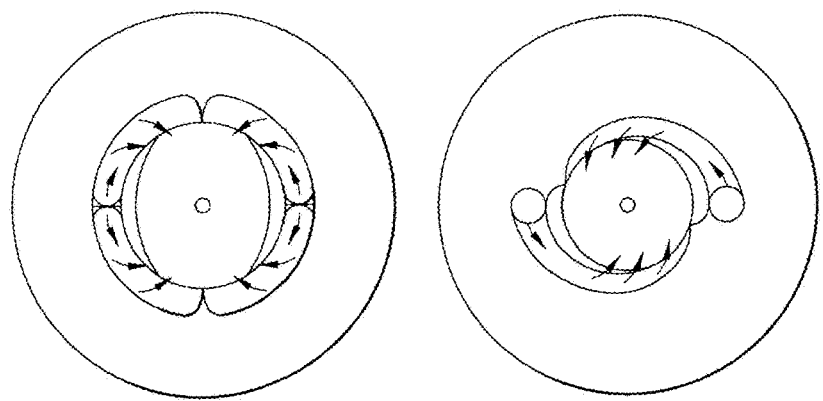
Figure 8 : Two examples of two stream 'bow-tie' deflectors.
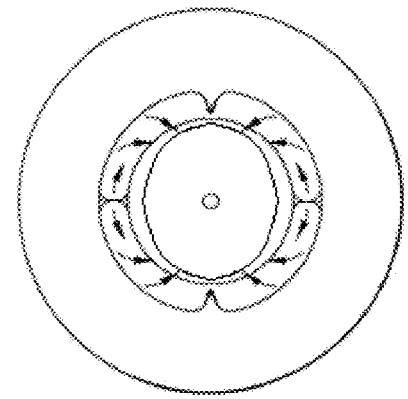
Figure 9. Bow-tie deflector with a connected dam

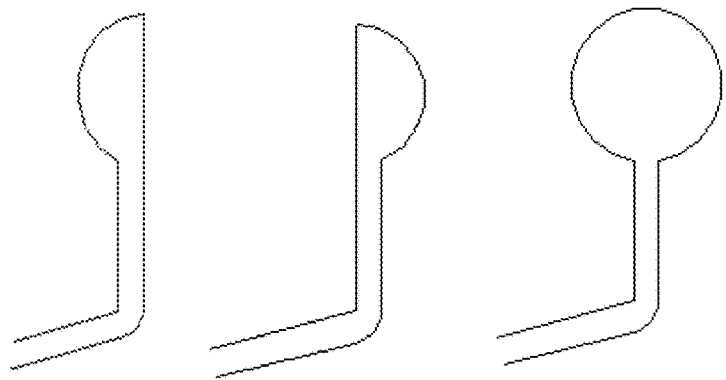
Figure 10. Grooves cut into either face or both
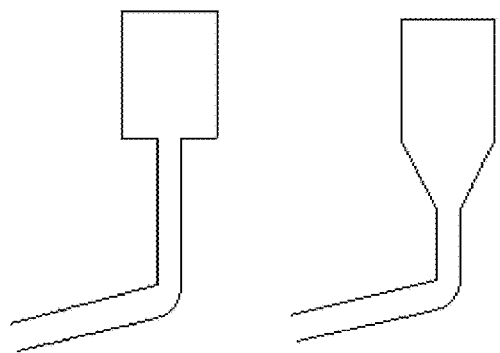
Figure 11. Other potential shapes for grooves.
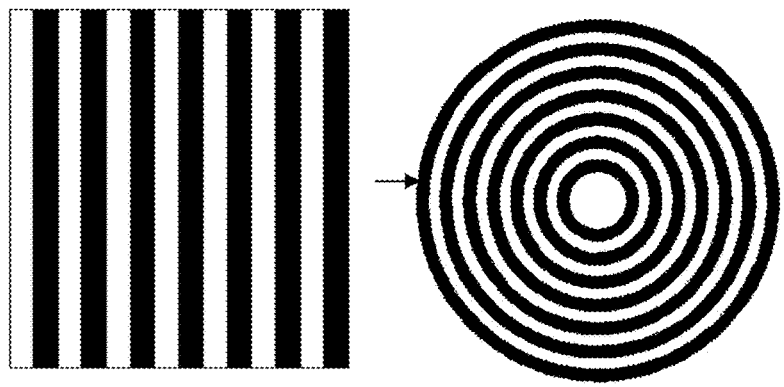
Figure 12. Vertical layers are formed into annular rings with a bow-tie deflector

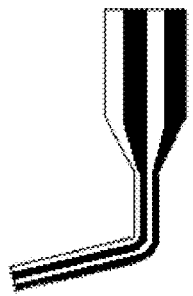
Figure 13. Four vertical layers flowing over dam and forming four annular rings
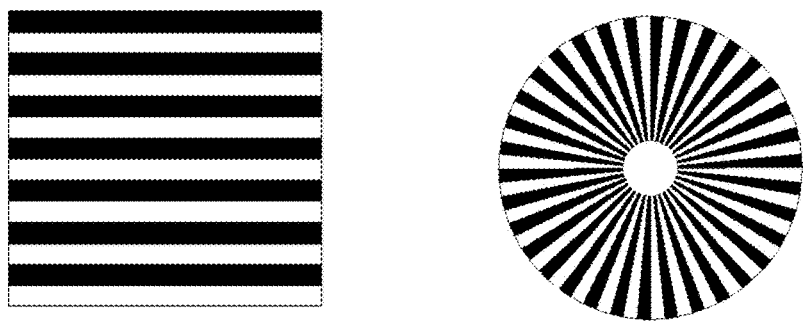
Figure 14. With a bow-tie deflector, horizontal layers may form spokes or spirals such as those found in Figure 7.
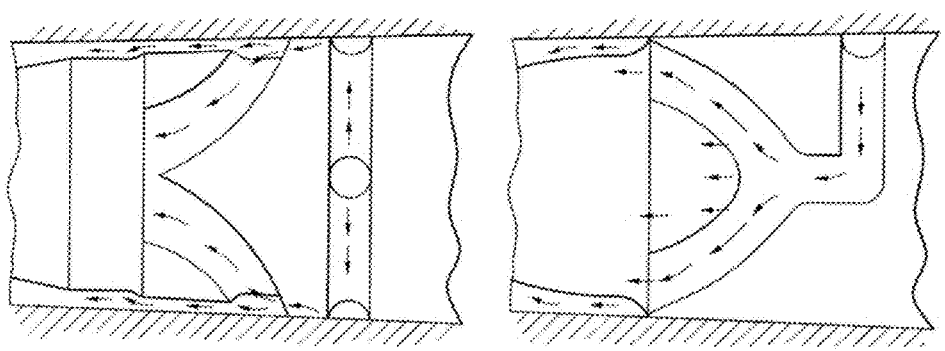
Figure 15. An example of a circumferential deflector

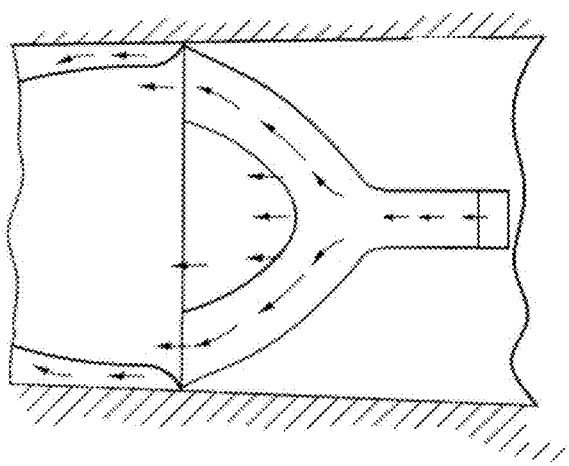
Figure 16: The stream of material(s) flowing directly at the dam.
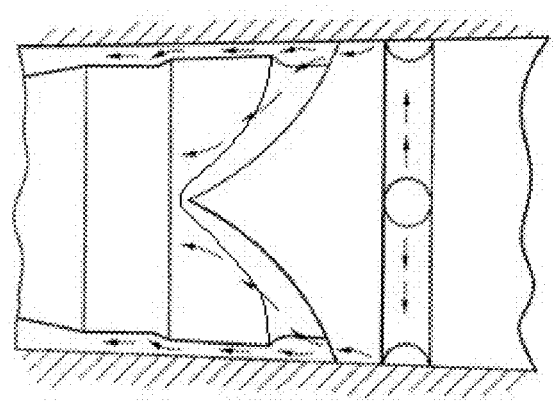
Figure 17: A circumferential deflector with a connected dam
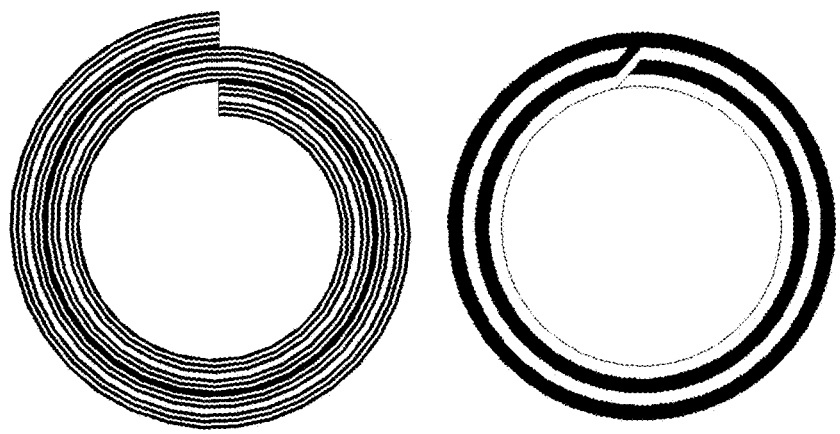

Figure 18. Examples of a stream wrapped by a wrapping deflector
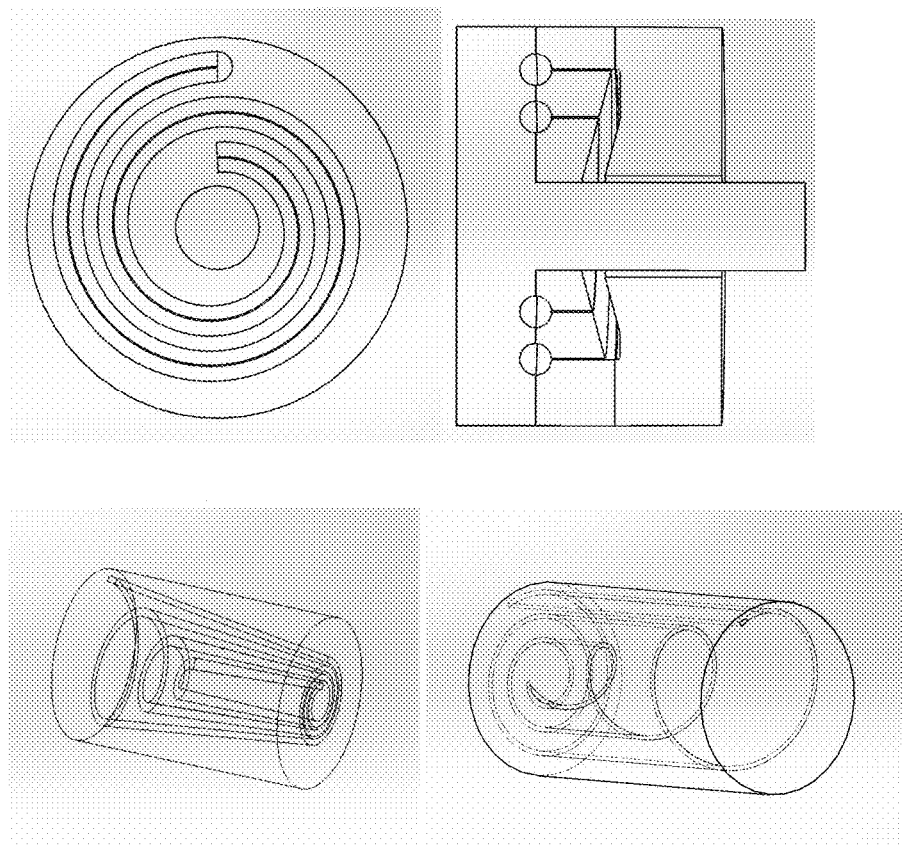

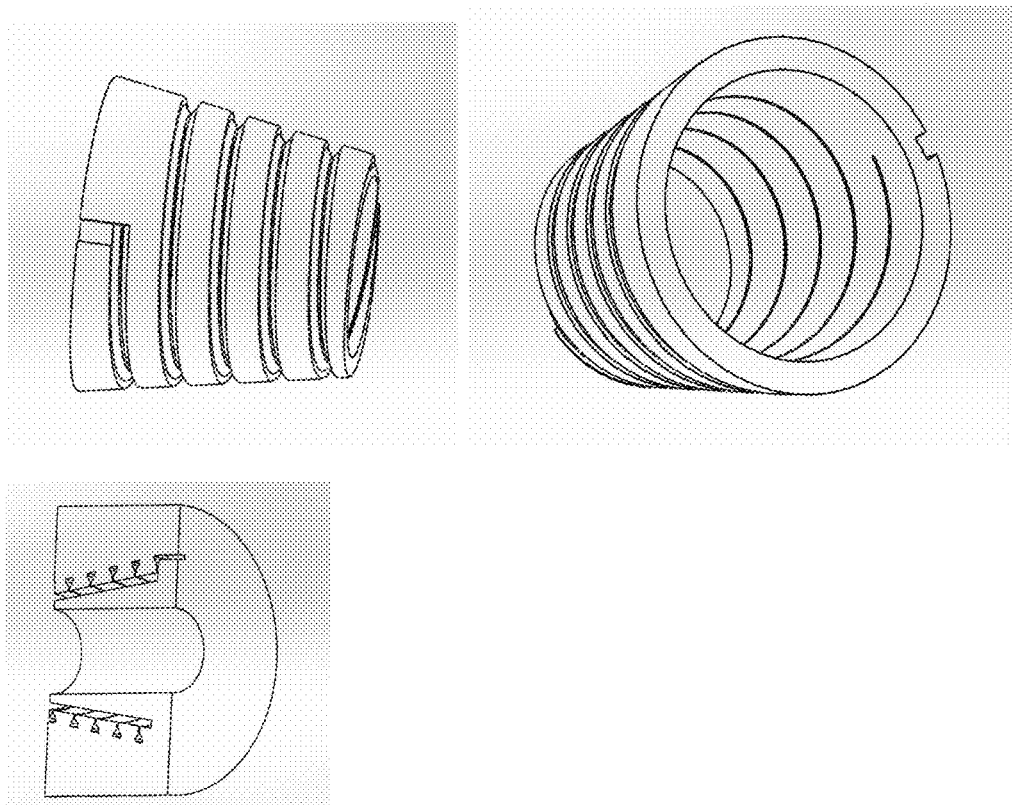
Figure 19. Examples of wrapping deflectors.
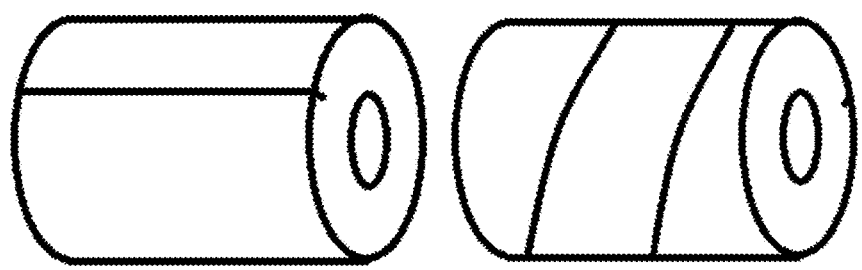
Figure 20. A striped tube with stationary components and with a rotating component

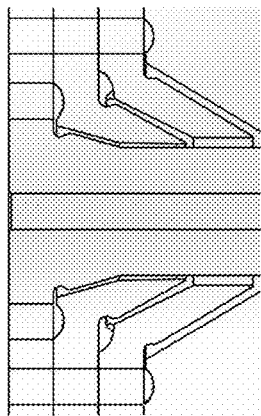
Figure 21. Multiple stacked deflectors
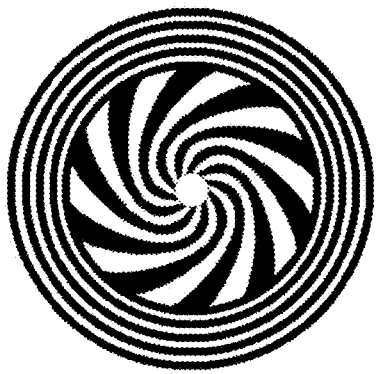
Figure 22: A product made by stacking two deflectors with the annular layers being applied onto the spiral layers.

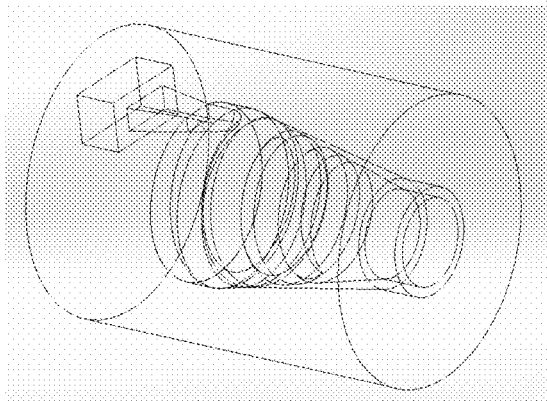
Figure 23: Example of a single stream deflector design with a spot for an attached feedblock
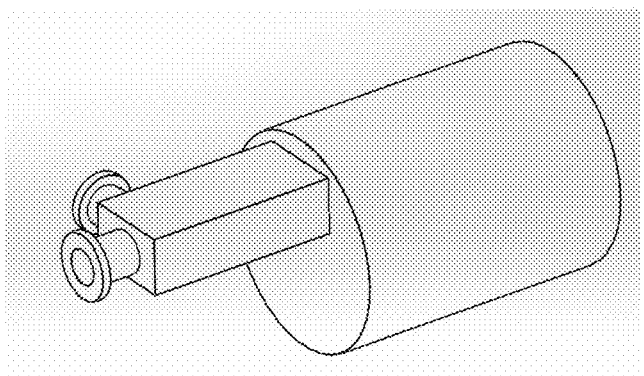
Figure 24: A head with a single feedblock attached with two connections for extruders
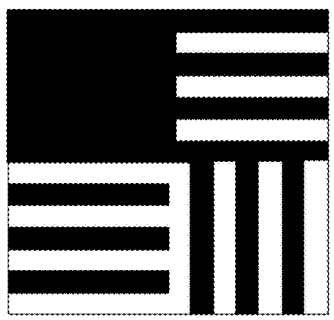
Figure 25. Example of input stream

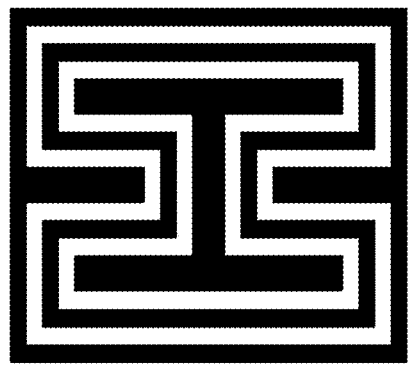
Figure 26: An example stream
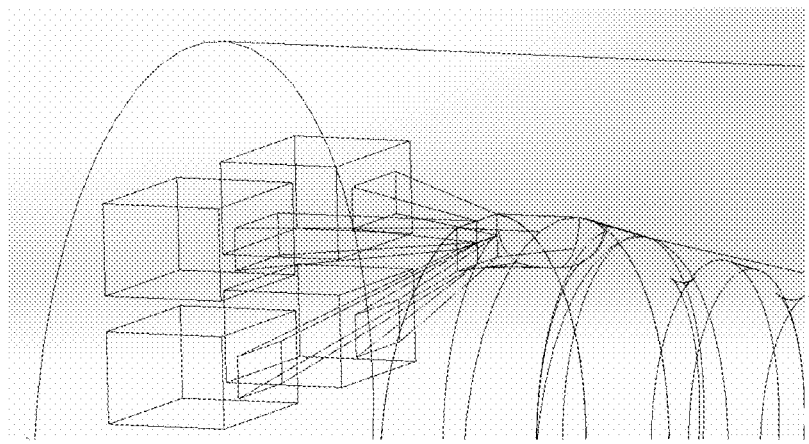
Figure 27. Single stream from 4 streams
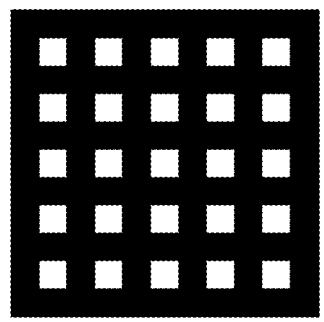
Figure 28

METHOD OF TUBULAR MICROLAYER AND MULTI-COMPONENT CO-EXTRUSION VIA DEFLECTOR PERTURBATION

FIELD

The present disclosure generally relates to extrusion die systems. In particular, the present disclosure relates to multilayer/multicomponent tubular extrusion of materials by deflection perturbation of one or more stream(s) to generate new geometries. The products of these deflected streams and layers may contain small sized grain features, in the range of mili, micro and nanosized grain features, in a tubular or profile shape.

BACKGROUND OF THE INVENTION

Multilayer coextrusion offers many unique design possibilities in the world of plastics. There are many established technologies for the creation of flat films with tens to thousands of layers. Such technologies generally utilize a feed-block which will either create the layers of polymer through layer by layer addition or create a layer pattern and then multiply it through a layer multiplication technique, or through some combination of the two.

With the ability to create microlayers comes the ability to create unique structures with a multi-component approach of merging separate streams of plastic together. This combined stream could also undergo a multiplication technique to create new layered streams.

Conventional extrusion formed products are limited to approximately twelve layers. Multistream/multilayer extrusion processes can extend these limitations. Extrusion technologies are well known in the art examples of which are described in U.S. Pat. Nos. 6,669,458, 6,533,565 and 6,945,764, and are commonly owned by the assignee of the instant application. Micro-layer extrusion processes are specialized extrusion methods that provide products with small grain features such as described in U.S. Pat. No. 7,690,908, (hereinafter the "'908 Patent") and U.S. Patent Publication 2012/0189789 (hereinafter the "'789 Publication") both of which are commonly owned by the assignee of the instant application, the disclosures of which are incorporated herein by reference in their entirety.

Typical micro-layer products are formed in a sheet. If a tubular product is desired, the microlayer is first extruded as a sheet and then made into the tube. This creates a weld line or separation between the microlayers. The '908 Patent describes a cyclical extrusion of materials by dividing, overlapping and laminating layers of flowing material, multiplying the flow and further dividing, overlapping and laminating the material flow to generate small grain features and improve properties of the formed product. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with micro/nano-sized features from the rejoining; and forming a tubular shaped micro-layer product from the combined laminate output.

SUMMARY OF THE INVENTION

The present invention relates to a method of transforming multilayered and/or multi-component streams (such as described in FIG. 1) into tubular shapes (see FIG. 2 for example) prior to or during extrusion by passing the streams over a deflector (such as a spiral, bowtie, circumferential and/or wrapping deflectors). The invention also relates to dies containing spiral, bowtie, circumferential and/or wrapping deflectors and products made by such methods.

These multilayered/multi-component streams comprise so-called plastics including but not limited to polyethylenes, polypropylenes, polystyrenes, polyvinyl chlorides, polytetrafluoroethylenes (PTFE), polysulfones, polyphenylene oxides, polybutylene terephthalates, polyvinylidene chlorides, polyethylene terephthalates, polystyrenes, polycyclohexane diethylene terephthalates, styrene-butadiene-acrylonitrile copolymer, polybutylene naphthalates, nylons such as nylon 11, nylon 12, polyimides, polyamides, polycarbonates, polyurethanes, polyacetals, polyether amides, polymethylmethacrylates, epoxys and polyester amides. Other plastics or polymers which comprise streams are considered obvious extensions of this invention.

These tubular shapes include circular geometries as well as other tubular shapes such as but not limited to rectangular, elliptical or profile shape. Internally there may be layers, or even unique multi-component structures which both of which may include layers that can take any form such as annular rings, spirals, and/or spokes, or a variety of other structures apparent to this invention. The layers may also contain the same or different polymer and contain different fillers, particles and/or chemicals.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIG. 1 depicts a multilayered stream and a multi-component stream.

FIG. 2 depicts a cross section of conversion of a multilayer stream into a multilayered tube.

FIG. 3 depicts a single stream spiral deflector

FIG. 4 depicts a four stream spiral deflector.

FIG. 5 is an example of a spiral deflector with arrows denoting the directions of the material flow.

FIG. 6 is an example of a spiral deflector showing the distribution of four layers along the deflector.

FIG. 7 is an example of some geometries involving vertical or off angle layers.

FIG. 8 depicts two examples of two stream 'bow-tie' deflectors.

FIG. 9 depicts a Bow-tie deflector with a connected dam

FIG. 10 illustrates grooves cut into either face or both faces

FIG. 11 illustrates other potential shapes for grooves.

FIG. 12 depicts vertical layers formed into annular rings with a bow-tie deflector FIG. 13 depicts four vertical layers flowing over a dam and forming four annular rings FIG. 14 illustrates how a bow-tie deflector with horizontal layers may form spokes or spirals such as those found in FIG. 7.

FIG. 15 is an example of a circumferential deflector

FIG. 16 depicts a stream of material(s) flowing directly at the dam.

FIG. 17 illustrates a circumferential deflector with a connected dam

FIG. 18 provides Examples of a stream wrapped by a wrapping deflector

FIG. 19 provides Examples of wrapping deflectors.

FIG. 20 illustrates a striped tube with stationary components and with a rotating component.

FIG. 21 illustrates multiple stacked deflectors

FIG. 22 illustrates a product made by stacking two deflectors with the annular layers being applied onto the spiral layers.

FIG. 23 is an Example of a single stream deflector design with a spot for an attached feedblock.

FIG. 24 illustrates a head with a single feedblock attached with two connections for extruders.

FIG. 25 is an Example of an input stream.

FIG. 26 is an example stream.

FIG. 27 is an Example of Single stream formed from 4 streams.

FIG. 28 illustrates merging a stream with horizontal layers side by side with a stream without layers.

DETAILED DESCRIPTION OF THE INVENTION

Spirals

Figure 29:
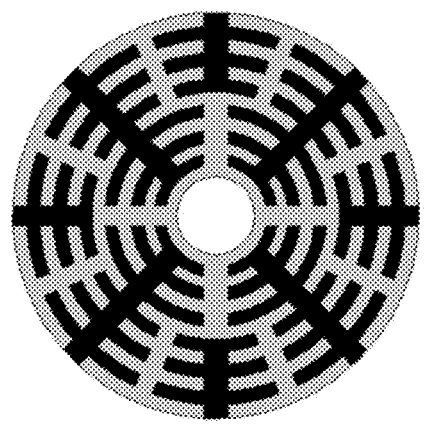
FIG. 29 illustrates tubular designs which could be made by multiple streams resulting in stem and branch features.

One embodiment of the invention relates to a stream of layers fed into a die containing a spiral deflector or groove which will act to wrap the stream into a tubular shape (see FIGS. 3 and 4). At first the stream will travel primarily in the direction of the spiral groove. As the spiral gets shallower or the gap between the deflector and the outer wall widens, the material will transition to flowing primarily forward (see FIGS. 5 and 6). There may be a singular entrance or multiple entrances for streams. The streams may also be identical or have their own unique composition. Depending upon the design of the spiral deflector and the operating conditions, the streams will blend differently. The spiral deflector may be a spiral groove or deflection within the die assembly such that the multilayered/multicomponent streams traveling in a linear forward direction are perturbed so as to twist into a forward spiral direction.

The design of a spiral will affect the end result of how vertical or off angle layers are translated. The tubular products depicted in FIG. 7 have a limited number of layers for illustration purposes. Products of the invention may contain many layers, from under 10 to thousands of layers (even hundreds of thousands or a million). Certain products such as tubes, rods or coated substrates may have the thickness of layers increasing from the core to the outside edge. Other tubes may have the opposite orientation and yet other tubes may have even thicknesses from inside to outside. Tubes may be designed to have differential thicknesses of layers as manipulated by the incoming stream. Layer thickness may be in the millimeter, micrometer or nanometer dimension.

Bow-Tie

Another embodiment of the invention relates to methods, dies and products comprising a stream or streams of layer(s) fed into a die containing a 'bow-tie' deflector which will act to wrap the stream into a tubular shape. The streams may also be multicomponent. So-called 'bow-tie' deflectors are known in the art and include for example those found in U.S. Pat. Nos. 6,345,972, 6,077,062, and 5,980,226. These deflectors rely on material flowing in a groove(s) while bleeding over an edge or 'dam' radially inward to form a balanced tube. The dam can be modified by changing the width and distance from the wall to the edge which determines how easily a fluid will spill over. By changing these characteristics a balanced flow can be achieved. FIG. 8 illustrates two types of two stream bow tie defectors. The one on the left splits each stream into two directions while the one the right distributes each stream in one direction.

These deflectors can be designed to use any number of streams as their input. Each dam could be made to span their own number of degrees. For example one stream could span 180 degrees of a tube while another could span 120 degrees with a third spanning the remaining 60 degrees. The designs in FIG. 8 show a space between adjoining dams. This gap may or may not be present, such as the dams for each stream connected in FIG. 9.

The grooves may also be cut into one or both faces of adjacent components (such as depicted in FIGS. 10 and 11). There may also be a short distance where material is made to flow in the grooves with a closed dam in order to ensure proper orientation of streams.

In a bow tie design, there is a bending of layers, causing vertical layers to orient in annular rings.

Circumferential Deflector

Another embodiment of the invention relates to a stream or streams of layers fed into a die containing a 'circumferential' deflector which will act to wrap the stream into a tubular shape. The streams may also be multicomponent. The 'circumferential' deflectors are known in the art such as for example those found in U.S. Pat. No. 6,135,750. These deflectors rely on material flowing in a groove(s) while bleeding over an edge or 'dam' in the direction of the flow to form a balanced tube. The dam can be modified by changing the width and distance from the wall to the edge which determines how easily a fluid will spill over. By changing these characteristics a balanced flow can be achieved.

FIG. 15 depicts a single stream of material(s) which will be split into two streams and then is balanced as it is split into four streams while bleeding over the dam. Instead of the initial split, multiple streams could be introduced which could flow directly at their own dam. With this approach, these deflectors can be designed to use any number of streams as an input. As with the bow-tie deflectors, each dam could be made to span their own number of degrees. The design in FIG. 15 depicts a space between adjoining dams. This gap may or may not be present, as the dams for each stream may be connected.

Wrapping Deflector

Another embodiment of the invention relates to a stream or streams of layers fed into a die containing a 'wrapping' deflector which will act to wrap the stream into a tubular shape, such as in FIG. 18. The streams may also be multicomponent. These deflectors may rely on material flowing in a groove(s) while bleeding through a slit or 'dam' to wrap material any number of times in a tubular shape. The dam can be modified by changing the length or thickness which determines how easily a fluid will spill flow through. The size of the groove can also be modified. By changing these characteristics a balanced flow can be achieved. FIG. 19 a-g, depict several wrapping deflectors. In general, the deflectors work by making flow in the wrapping direction less torturous than the direction of extrusion. Multiple streams could also be inter-wrapped within each other.

Another embodiment of the invention relates to such dies wherein the outer wall or inner wall or both can also be made to rotate to encourage the wrapping motion. Without a rotating tip or die the outside and inner surfaces should remain constant in the direction of extrusion. If the tip or die were to rotate this would cause a shearing rotation of the cross section which would be apparent on the respective inner or outer surface. FIG. 20 illustrates the effect of a rotating component on a colored stripe on the outer surface of an extruded product. The stripe remains straight without a rotating component (left) but wraps around the product when a outer rotating component is present (right).

In another embodiment, the products of the invention may be extruded along with a core substrate such as a wire, be hollow or be made into a solid rod. Layers can also be introduced in a vertical orientation or any angle in between.

Multiple deflectors may also be stacked so as to layer multiple streams of layers onto each other, see FIG. 21. Inner and outer skin layers can also be applied through traditional means.

Another embodiment of the invention relates to products containing multiple layers of varying components.

Another embodiment relates to products containing filler particles and/or fibers. Certain products contain filler particles or fibers aligned along the extrusion axis.

Another embodiment relates to products wherein the fibers are carbon fibers, more specifically carbon nanotubules.

Extrusion of the spiral or deflected flows allows for enhanced alignment of filler particles or fibers along the direction of the extrusion. Filler particles are mostly restrained within each layer and as they approach a magnitude of size similar to the fiber or particle size, shear stresses align particles in the direction of the extrusion.

Fillers also refers to flakes such as tin flakes.

Fibers include single fibers or a myriad of other arrangements. Some exemplary arrangements include but are not limited to yarns, a tow of fibers or yarns, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Fibers also generally possess an average aspect ratio of 10-3000 and more commonly are fibers having an average aspect ratio of 20-1000. Aspect ratios of 20-350 and 50-200 are specifically envisioned. Various types of organic and inorganic fibers are suitable either in monofilament or stranded form (including bundles of fibers bonded together to make a single element which serves as a single fiber in the sense of orientation and reinforcement).

Filler particles or fibers include wood fibers (including groundwood, thermomechanical pulp (TMP) and bleached or unbleached kraft or sulfite pulps), vegetable fibers (including cellulose, lignin, cotton, hemp, jute, flax, ramie, sisal and bagasse), animal fibers (including proteinaceous strands such as silkworm silk, spider silk, sinew, catgut, wool, sea silk and hair such as cashmere wool, mohair and angora, fur such as sheepskin, rabbit, mink, fox, or beaver), other synthetic polymeric fibers (including rayon, modal, Lyocell polyamide nylon, PET or PBT polyester, phenol-formaldehyde (PF), polyvinyl alcohol fiber (PVA) vinylon, polyvinyl chloride fiber (PVC) vinyon, polyolefins (PP and PE) olefin fiber, acrylic polyesters, pure polyester, aromatic polyamids (aramids) such as Twaron, Kevlar and Nomex, polyethylene (PE), HMPE (e.g. Dyneema or Spectra), polyurethane fiber, and elastomers including spandex), metallic fibers such as those drawn from ductile metals such as copper, gold or silver and extruded or deposited from more brittle ones, such as nickel, aluminum or iron, stainless steel fibers, silicon carbide fibers, clay particles, carbon fibers or glass fibers.

Particularly important fibers include the so-called micro and nano fibers including nanocellulous fibers and synthetic nanotubules including carbon nanotubes, inorganic nanotubes and DNA nanotubes.

Fibers also includes microfibers known as sub-denier fibers (such as polyester drawn to 0.5 dn). Denier and Detex fibers include fibers categorized by weight and length measurements. Fiber designs also includes fibers split into multiple finer fibers. Most synthetic fibers are round in cross-section, but special designs can be hollow, oval, star-shaped or trilobal. The latter design provides more optically reflective properties. Synthetic fibers may also be crimped to provide a woven, non woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Fibers alignment can also be tailored by the application of external forces such as magnetic fields.

Another embodiment of the present invention relates to extruded multilayer medical devices comprising one or more pharmaceutical product(s) or drug substances (including mixtures thereof) layered with one or more biocompatible materials that control the time release of the delivery of the drug substance.

Medical devices include catheters, stents, threads, cables (including fiber optic cables), pills, capsules, lozenges, tablets, implants, medical tubing, sheaths, clamps, sutures, tapes, sheets and endotracheal devices.

Another embodiment of the invention relates to a medical tubular device comprising: a polymeric tube containing small sized grains, nano or micro-sized features and a drug substance.

Another embodiment of the present invention is directed to extrusion products possessing electrical properties. More specifically, these extrusion products contain multilayers wherein one or more layers contain electrical conducting materials and more specifically nanoparticle electrical conducting materials. An extrudable metal could be used as a material to form conductive layers. Such metals could also be used with compatible plastics to form insulated layers or pathways. Aspects of the disclosed embodiments are also directed to creating and producing nanoparticle products using multilayers/multistreams (and also optionally wherein the layer may be in the micro or nano dimension) to enhance the electrical properties of the products. In one embodiment, each layer may be comprised of one or more elements that facilitate one or more of the layers to conduct electricity.

One specific embodiment relates to an extruded multilayer polymer product comprising one or more layers possessing electrical properties. A more specific embodiment relates to a product wherein said one or more layers are milli, micro or nano size, wherein said one or more layers contain nanoparticle electrical conducting materials. More specifically wherein said product wherein said one or more electrical conducting layers are layered between nonconducting layers.

Another embodiment relates to Bragg reflector comprising multilayered co-extrusion of milli-to-micro- to nano-polymer layers in a tubular shape. Such tubular shapes may be of variable length and construction. Certain tubular shapes may contain a core (which may be substantive or hollow). When the core is substantive it may comprise gases, liquids or solids. Suitable solids include polymeric materials or matter which is coextruded with the multilayer tube. Such polymeric materials may be transmissible to incident light. Suitable liquids include water, alcohols and organic liquids.

Bragg reflectors or Bragg fiber can be produced according to the present methods of multilayered co-extrusion technology. Alternating layers of deflected polymeric material form a waveguide that allows the transmittance of electromagnetic waves. Waveguides are used in a variety of applications, specifically lasers, sensors, and optical fibers. A Bragg reflector can be used to amplify the total internal reflection of a solid optical fiber or be used in a hollow optical fiber to provide the internal reflection.

Alternating layers may be of constant, variable or Chirped gradient thickness. Layers ¼ the wavelength of incident light will constructively magnify the incident light. Materials with different refractive indices are layered to produce a Bragg reflector. Light reflects and refracts from each layer interface. By alternating materials of high and low refractive indexes in layers ¼ the wavelength of incident light, the reflected light will constructively interfere with the reflected light from previous layers, amplifying the reflection.

Preparation of Streams

Another embodiment of the invention relates to preparing the stream(s) of layers. Streams of layers may be broken up into different orientations and compositions. Virtually any input multilayer or multi-component stream may be manipulated by the deflectors mentioned above to yield new tubular designs.

In FIGS. 21 and 22 a modular design is shown where the feedblock could be interchanged with another to change what the input stream would look like. A non-modular design could also be envisioned where the feedblock is integrated into the extrusion head. Furthermore, feedblocks could also operate in series; a feedblock could accept a stream(s) from a separate feedblock(s) as its input.

Also encompassed in this invention is the following manipulation of streams into singular streams which can be utilized by any deflector which forms tubular shapes.

The input streams can range anywhere from a few layers of a material to a collage of materials and layers joined together. In the '789 Publication streams of layers are created and merged as they form the shape of a tube. This approach differs in that separate streams can be merged into one stream which will then be formed into a tube by a deflector. The streams can be merged all at once, one at a time or in stages. While it has been possible to generate annular layers, in this application streams of layers and materials can be joined in any orientation. FIG. 25 depicts one input stream formed by combining four separate streams. Two are comprised of horizontal layers, one is comprised of vertical layers and another is just one material. The example in FIG. 25 is in a rectangular shape and formed by rectangular shaped streams but streams can take the form of and be formed by streams of any shape such as circular, triangular or profile shapes.

The stream shown in FIG. 26 could be created in a number of ways such as through layer by layer creation, through merging multiple streams or through folding one stream of layers.

FIG. 27 describes another embodiment with a single stream formed by four separate streams. These four separate streams are introduced separated on left, merge together and then enter a spiral deflector.

With the multi-component approach of stream preparation it is possible to design for certain shapes and structures within a stream. Along with the ability to reach the micro and nano scale with layers, it is feasible to design for internal features or entire structures to also be in the micro to nano scale. Through chemically or mechanically removing some layers, these features could be released and/or exposed to the environment.

Streams can also contain internal structures. One method to create this stream is to merge a stream with horizontal layers side by side with a stream without layers, and then perform further layer multiplication, see FIG. 28 for example. Other embodiments of FIG. 28 contain thousands of layers, the squares in the streams could be on the nano scale. If the black material were dissolved, strands of white material would be released.

Tubular designs which could be made by multiple streams would result in stem and branch features such as depicted in FIG. 29.

3D Printing

Another embodiment of the present invention relates to this stream(s) to deflector(s) extrusion approach used as an input source in 3D printing. A multilayered or multi-component stream could be introduced to a deflector in order to form a tubular shape. This tubular shape could then be passed through the 3D printing nozzle. There are numerous applications of these methods including the ability to embed geometric, border, electrical, micro and nano detail into the printing product.

Figure 30:
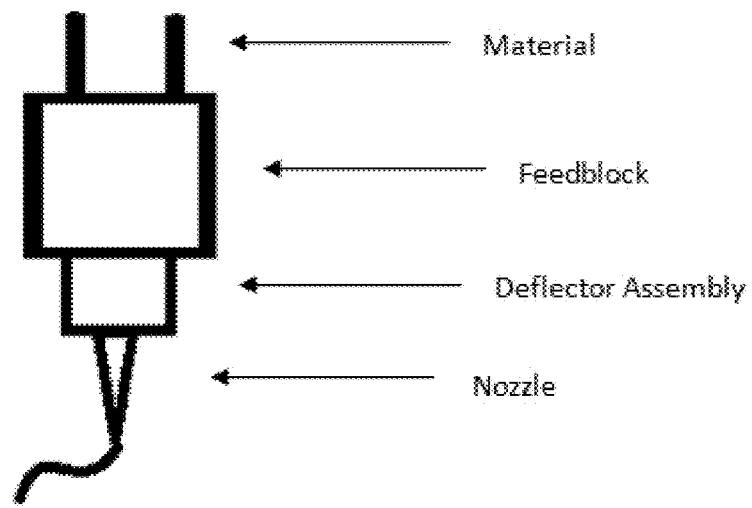
FIG. 30 illustrates a feedblock(s) and deflector(s) positioned right before the nozzle so as to move with the nozzle.
Figure 31:
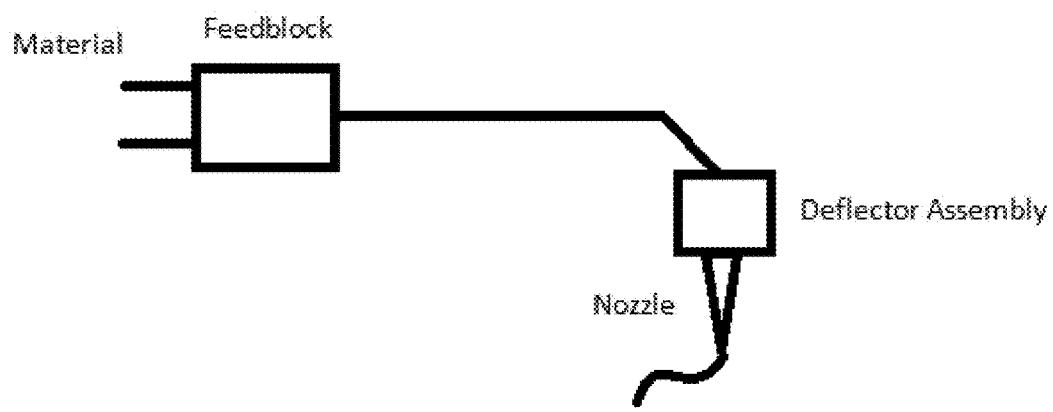
FIG. 31 illustrates a stationary feedblock(s) in which a molten stream is pumped to the deflector(s) and nozzle which would move together.
Figure 32:
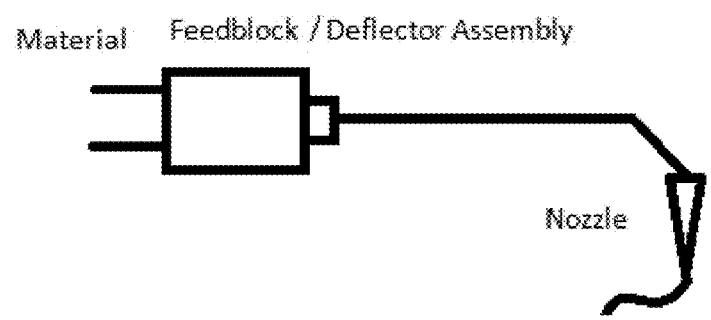
FIG. 32 illustrates a feedblock(s) and deflector(s) could remain separated from the nozzle and the tubular stream would flow towards the nozzle.

Another embodiment of the invention refers to feedblock(s) and deflector(s) positioned right before the nozzle so as to move with the nozzle, such as described in FIG. 30. Alternatively, feedblock(s) could remain stationary and pump to deflector(s) and nozzle which would move together, as shown in FIG. 31. Additionally, the feedblock(s) and deflector(s) could remain separated from the nozzle and the now tubular stream would flow towards the nozzle, such as shown in FIG. 32.

The deflected products may also be extruded, packaged and used in a manner typical of 3D printing.

The invention claimed is:

1. A method of transforming a multi-component input into a tubular shape by feeding said input into a die containing one or more deflectors, wherein said multi-component input comprises a merged stream of multiple streams, other than a flat orientation of layers, which are:
   a) independent in composition, orientation or layers; and
   b) said streams are merged side-by-side, in profile or in spiral;
   comprising passing said multi-component merged stream over one or more spiral, bowtie, circumferential or wrapping deflectors and then extruding the transformed stream into a tubular shape product.

2. The method according to claim 1 wherein one or more of said deflectors are spiral deflectors.

3. The method according to claim 1, wherein one or more of said deflectors are bowtie deflectors.

4. The method according to claim 1, wherein one or more of said deflectors are circumferential deflectors.

5. The method according to claim 1, wherein one or more of said deflectors are wrapping deflectors.

6. The method according to claim 1, wherein the tubular shape product has two to ten thousand layers.

7. The method according to claim 1, wherein the tubular shape product has two to one thousand layers.

8. The method according to claim 1, wherein the tubular shape product has two to one hundred layers.

9. The method according to claim 1, wherein the tubular shape product has two to ten layers.

10. The method according to claim 6, wherein the tubular shape product layers are of multiple differing thicknesses.

11. The method according to claim 10, wherein at least one of the tubular shape product layers is about a millimeter thick.

12. The method according to claim 10, wherein at least one of the tubular shape product layers is e about a micrometer thick.

13. The method according to claim 10, wherein at least one of the tubular shape product layers is about a nanometer thick.

\* \* \* \* \*